(12) United States Patent
Khushboo et al.

(10) Patent No.: US 8,363,947 B2
(45) Date of Patent: Jan. 29, 2013

(54) HANDWRITTEN CHARACTER RECOGNITION BASED ON FREQUENCY VARIATIONS IN CHARACTERS

(75) Inventors: Choudhary Khushboo, Palo Alto, CA (US); Shiva C T Kumar, Bangalore (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/848,173

(22) Filed: Jul. 31, 2010

(65) Prior Publication Data
US 2012/0027302 A1  Feb. 2, 2012

(51) Int. Cl.
*G06K 9/18* (2006.01)
(52) U.S. Cl. ........ 382/186; 382/178; 382/187; 382/179; 382/198; 382/199; 345/467; 345/468; 345/469; 345/472; 345/472.1
(58) Field of Classification Search .......... 382/186, 382/178, 187, 179, 198, 199; 345/467, 468, 345/469, 472, 472.1
See application file for complete search history.

(56) References Cited

U.S. PATENT DOCUMENTS

| | | | |
|---|---|---|---|
| 4,162,482 A | | 7/1979 | Su |
| 4,718,103 A | | 1/1988 | Shojima et al. |
| 5,321,768 A | * | 6/1994 | Fenrich et al. ........ 382/178 |
| 5,459,809 A | | 10/1995 | Kim et al. |
| 5,561,720 A | * | 10/1996 | Lellmann et al. ........ 382/178 |
| 5,940,532 A | | 8/1999 | Tanaka |
| 5,970,170 A | | 10/1999 | Kadashevich et al. |
| 6,212,299 B1 | | 4/2001 | Yuge |
| 6,275,611 B1 | | 8/2001 | Parthasarathy |
| 7,302,099 B2 | | 11/2007 | Zhang et al. |
| 7,349,576 B2 | | 3/2008 | Holtsberg |
| 7,359,551 B2 | | 4/2008 | Napper |
| 2002/0018071 A1 | * | 2/2002 | Ohnishi et al. ............ 345/643 |
| 2009/0136136 A1 | | 5/2009 | Mori et al. |

OTHER PUBLICATIONS

Deshpande et al., "Handwritten devnagari character recognition using connected segments and minimum edit distance," TENCON 2007—IEEE Region 10 Conference, Taipei, Oct. 2007.
Hanmandlu et al., "Unconstrained handwritten character recognition based on fuzzy logic," Pattern Recognition vol. 36, Issue 3, Mar. 2003, pp. 603-623.
Blumenstein, "Cursive Character Segmentation Using Neural Network Techniques," Studies in Computational Intelligence, Publisher Springer Berlin / Heidelberg, vol. 90/2008. Online: http://www.springerlink.com/content/9495g1673871421k/.

* cited by examiner

*Primary Examiner* — Mike Rahmjoo
(74) *Attorney, Agent, or Firm* — Schmeiser, Olsen & Watts; John Pivnichny

(57) ABSTRACT

A method, system and computer program product for recognizing cursive and non-cursive handwriting. The invention comprises capturing a handwritten character as an image of pixels, partition the image into a plurality of segments each having a pixel ratio of the number of pixels in the segment divided by the total number of pixels in the image, and compare the pixel ratio for each segment to a value range associated with a corresponding segment of a reference character. The handwritten character is recognized as the reference character if more than a predetermined number of the segments in the image have the pixel ratios within the respective value ranges of the reference character.

11 Claims, 9 Drawing Sheets

HANDWRITTEN CHARACTER RECOGNITION BASED ON FREQUENCY VARIATIONS IN CHARACTERS

FIELD OF THE INVENTION

The invention relates generally to handwriting recognition, and more particularly, to a method and system for recognizing handwritten characters in cursive and non-cursive forms based on frequency variations in segments of the characters.

BACKGROUND

It is desirable to have applications running on hand-held electronic devices, such as telephones, personal digital assistants, and pad computers that can accurately recognize handwriting as these devices are becoming more popular. The users, for example, may write the characters with an electronic pen or stylus on an electronically-sensitive surface from which the handwriting is digitized and processed by the device. Alternatively, the users may write on an input surface, such as glass, with a regular pen or marker. The device then optically captures and processes the handwriting using optical character recognition methods. A common problem in handwriting recognition is the vast amount of variations in the ways individual users write characters. Several handwriting recognition technologies have been in use, but still do not provide good results, especially for cursive handwriting.

Cursive handwriting poses a significant challenge for correctly identifying a character due to variations in size, orientation and individual user idiosyncrasies in the writing. Further, users may write very differently, using angular alphabets or rectangular-edged alphabets instead of regular curves. Existing solutions typically map a sequence of writing strokes that a user makes to a previously captured image of a particular character to identify the character. This approach has a disadvantage where it can only recognize recorded images of written texts and generally not the handwriting strokes. Additionally, systems based on this technology can only handle separated alphabets rather than continuously and cursively written words and sentences. Further, these systems could only map the written characters to images of complete characters represented in a map based on feature points. The characters are then identified, for example, with Hidden Markov Modeling (HMM) methods.

Accordingly, there exists a need for an efficient method and apparatus for recognizing freestyle cursive and non-cursive handwriting without the aforementioned drawbacks.

SUMMARY

Embodiments of the present invention relate to a method, system and computer program product for recognizing cursive and non-cursive handwriting. The invention comprises capturing a handwritten character as an image of pixels, partitioning the image into line segments each having a pixel ratio of the number of pixels in the segment divided by the total number of pixels in the image, and comparing the pixel ratio for each segment to a value range associated with a corresponding segment in a reference character. The handwritten character is recognized as the reference character if more than a predetermined number of the line segments in the character image have the pixel ratios within respective value ranges of the reference character. The invention reduces a character image to a single-pixel width image before comparing the pixel ratio for each segment and partitions the image into a plurality of segments based on an image boundary and an image center.

The invention further partitions the examined segments into smaller sub-segments if multiple reference characters match the character image, and compares the pixel ratios for the sub-segments to arrive at the best matching reference character. A handwritten sample may be dissected into lines by identifying consecutive rows of white pixels in the handwriting image. Similarly, each handwriting line may be partitioned into individual words based on consecutive columns of white pixels. A word may be dissected into characters by identifying consecutive columns of recognizable pixels, e.g., black pixels on white background, that have generally the same number of pixels at the same height. The individual characters in the word are separated based on identified columns of recognizable pixels.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

Figure 1:
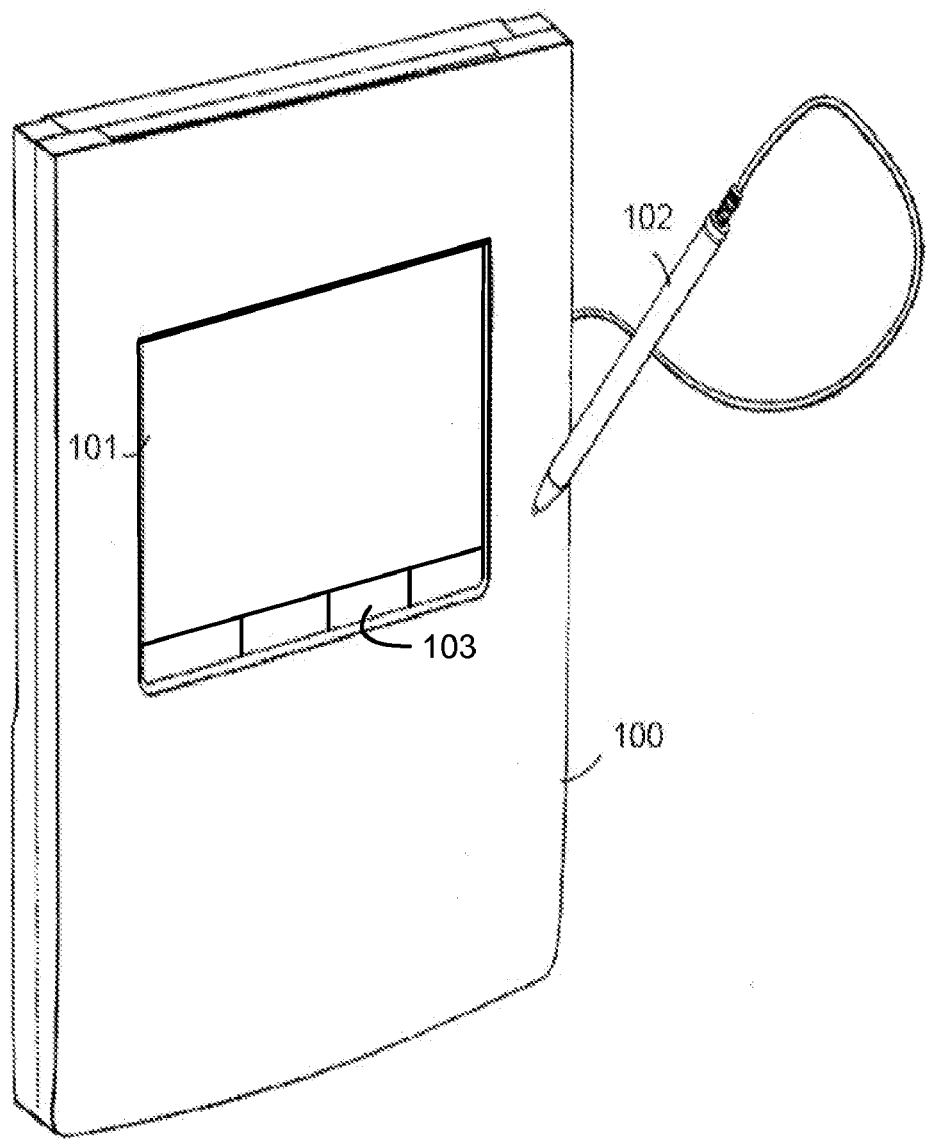
FIG. 1 illustrates an exemplary pad computer or hand-held device for providing handwriting recognition functions according to aspects of the present invention.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a micro-processor of a general purpose computer, special purpose computer, or other programmable data processing apparatus to produce a machine, such that the instructions, which execute via the micro-processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention relates to handwriting recognition. More particularly, the invention concerns a method, system and computer program product for recognizing handwritten cursive and non-cursive characters using frequency variations in segments of the written characters. Entering information into a computer or a computer-based hand-held device in the form of handwriting is a very desirable feature as it is more convenient and flexible for the user than using a traditional keyboard and a mouse. In a typical existing handwriting system, the user may write input text on electronically sensitive surfaces such as those used in electronic tablets, personal digital assistants (PDAs), and pad computers. These devices receive the user handwriting in digitized form and perform a character recognition process on the digitized handwriting to recognize the user input. An example of such a recognition process is described in U.S. Pat. No. 5,940,532. Another popular method for receiving handwriting input is through an optical input system, similar to the glass surfaces used in photocopiers and document scanners. In this method, the portable computer or device receives user handwriting by optically capturing and digitizing an image of the handwriting from a writing surface on the device. It next goes through a text recognition process similar to those used in electronically based input devices.

Referring now to FIG. 1, there is illustrated an example pad computer, tablet computer, or hand-held device 100 that can be used in accordance with aspects of the invention. Pad computer 100 includes a display surface 101, e.g., a digitizing flat panel or a liquid crystal display (LCD) display. Using digital pen 102, a user can write, select and manipulate information on the display surface 101. A user interface program in the pad computer 100 receives input from the user and transfers this input to system software for processing, as in a conventional computer. User input includes handwriting and commands provided on surface 101 as well as user selections provided through user menu windows 103. In one embodiment of the present invention, the system software includes a component for recognizing user handwriting input in accordance with aspects of the invention.

Alternatively, the pad computer or hand-held device 100 may have an optically based writing surface 101 rather than an electronically based writing surface. An example of the devices with optically based writing surfaces is the Trust Slimline Design Tablet TB-6300. These devices receive user handwriting in optical form and convert it to digital data before performing an optical character recognition of the user writing. Optical character recognition (OCR) refers to the process by which information is optically captured as an image and analyzed to determine what characters appear in the image. Conventional optical character recognition systems typically compare a character in an image to a character library to find a match for the optically captured character. While this process might recognize a limited set of standard printed characters, it often returns erroneous results when the characters are not in the character library. In particular, current optical character recognition systems cannot effectively recognize handwriting, especially cursive handwriting, due to wide variations in personal writing styles of the users. Such optical input systems, however, may incorporate aspects of the present invention in the recognition process to effectively recognize user handwriting.

Figure 2:
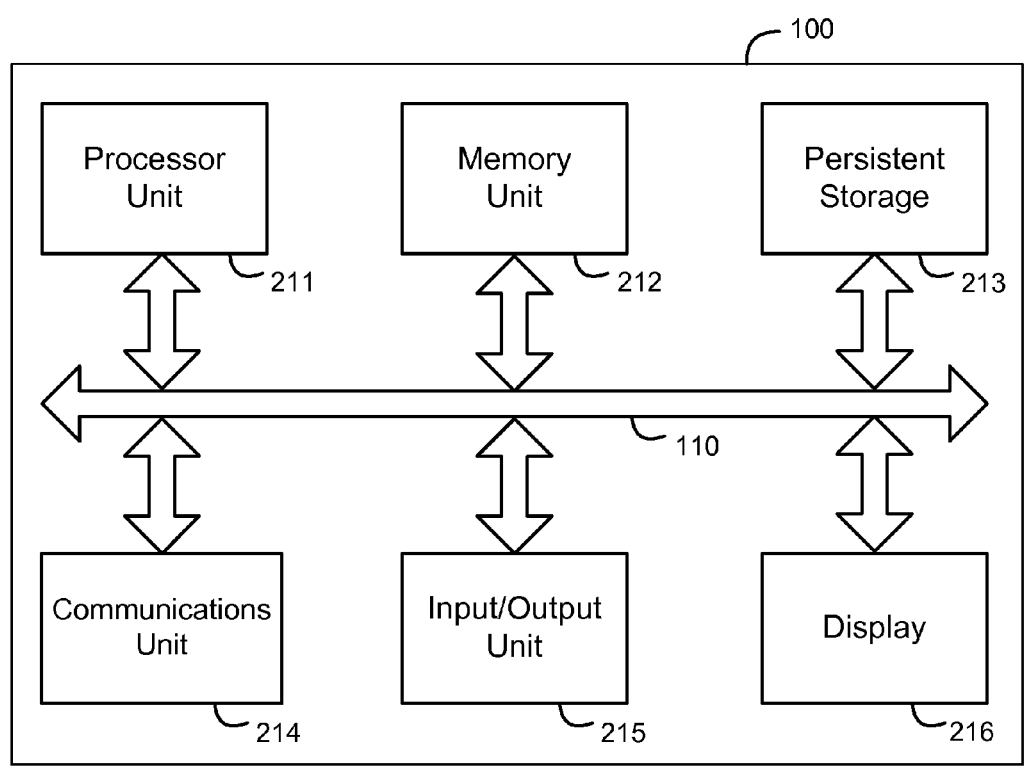
FIG. 2 is a block diagram of functional components in a representative computer in which aspects of the present invention may be implemented for recognizing handwriting.

FIG. 2 is a block diagram of functional components in an exemplary computer system 200 for implementing one or more aspects of the present invention. The computer system 200 includes at least one processor unit 211, a memory unit 212 such as RAM or ROM, and a persistent storage 213 such as a magnetic disk device. The computer system 200 may further have one or more communications unit 214 for communicating with other computers and devices, such as a network card. One or more input/output unit 215, such as a keyboard or a digital pen, allows data to be sent to or received from the computer system 200. A monitor 216 or other display devices visually present data from the computer 100 to users. Functional components in the computer system 200 communicate with each other through system bus 210. Computer programs are typically stored in persistent storage 213 until they are needed for execution, at which time the programs are brought into memory unit 212 so that they can be directly accessed by processor unit 211. Processor 211 selects a part of memory 212 to read and/or write by using an address processor 211 gives to memory 212 along with a request to read and/or write. Usually, the reading and interpretation of an encoded instruction at an address causes processor 211 to fetch a subsequent instruction, either at a subsequent address or some other address.

In one exemplary embodiment of the present invention, the computer system 200 provides an input/output device 215 in the form of a digital pen to allow characters handwritten using the pen to be recognized by the computer 200. Alternatively, the input/output device 215 may be a typical marker used for handwriting characters on an input surface that allows the written characters to be optically captured and recognized by the computer 200 using aspects of the invention.

The invention is distinguished from existing solutions in its versatility and simplicity by computing ratios of line segment lengths in angular slices centered on a fixed point to the total line length that represents the character. The use of line segment ratios result in unique combination of the line lengths in the slices for different alphabets. The lines in adjoining slices are continuous which lead to the condition that any other orientation of the line segments in a slice that satisfies the ratio relationship will not be possible. The particular distributions of the line segment lengths in the different slices are maintained to remove the impact of variations in angular or rectangular writing which are inherent in cursive handwriting (idiosyncrasies).

Figure 3:
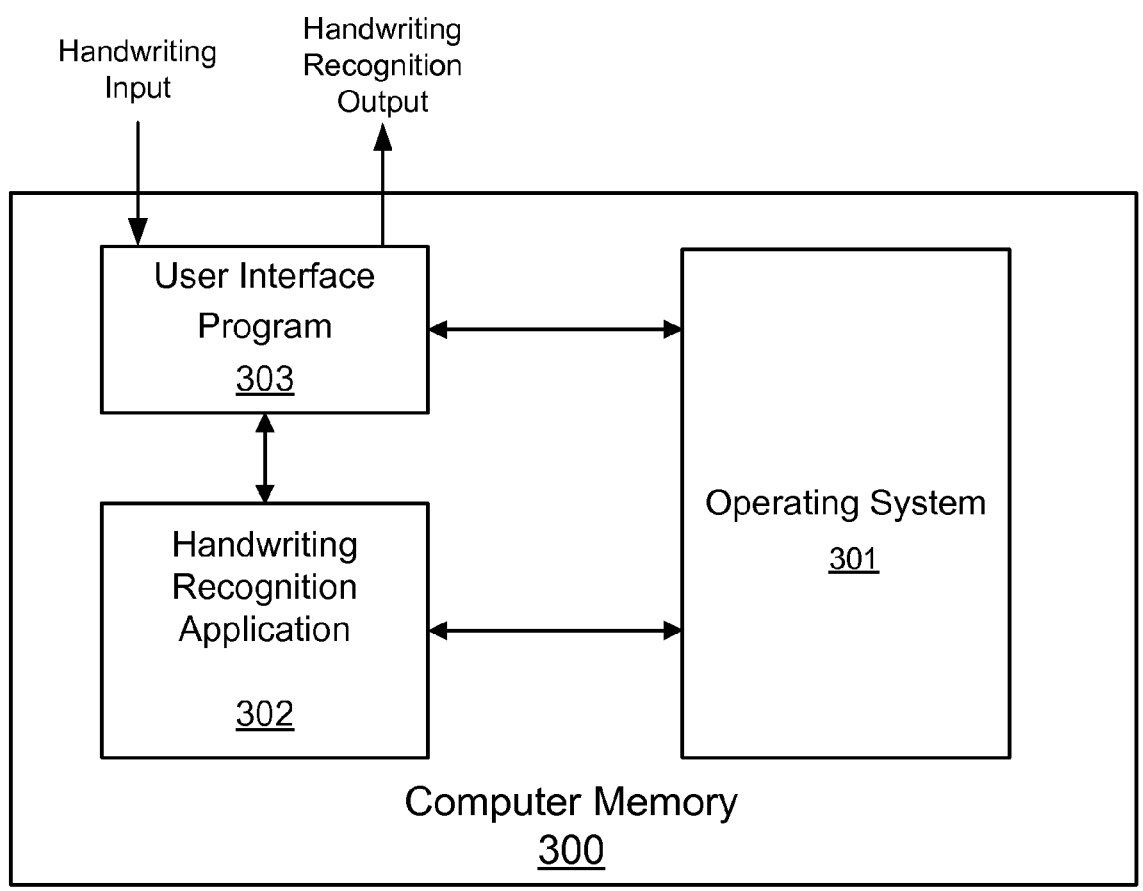
FIG. 3 is a block diagram showing the relationships among a handwriting recognition application, a user interface, and a computer operating system, according to an exemplary embodiment of the invention.

FIG. 3 is a block diagram showing the relationships among a handwriting recognition application, a user interface, and a computer operating system, in accordance with an exemplary embodiment of the invention. A computer 201 typically has an operating system 301 running in memory 300 during operation of the computer 201. Operating system 301 manages resources in the computer 201 and interacts with other programs running in the system such as handwriting recognition application 302 and user interface program 303. User interface program 303 receives input from sources external to the computer 201 and communicates such input to operating system 301 and recognition application 302. In the illustrated embodiment, the input to user interface program 303 is a handwriting input. Further, user interface program 303 receives recognition output and instructions from the recognition application 302 and operating system 301, and conveys them to the user.

Figure 4:
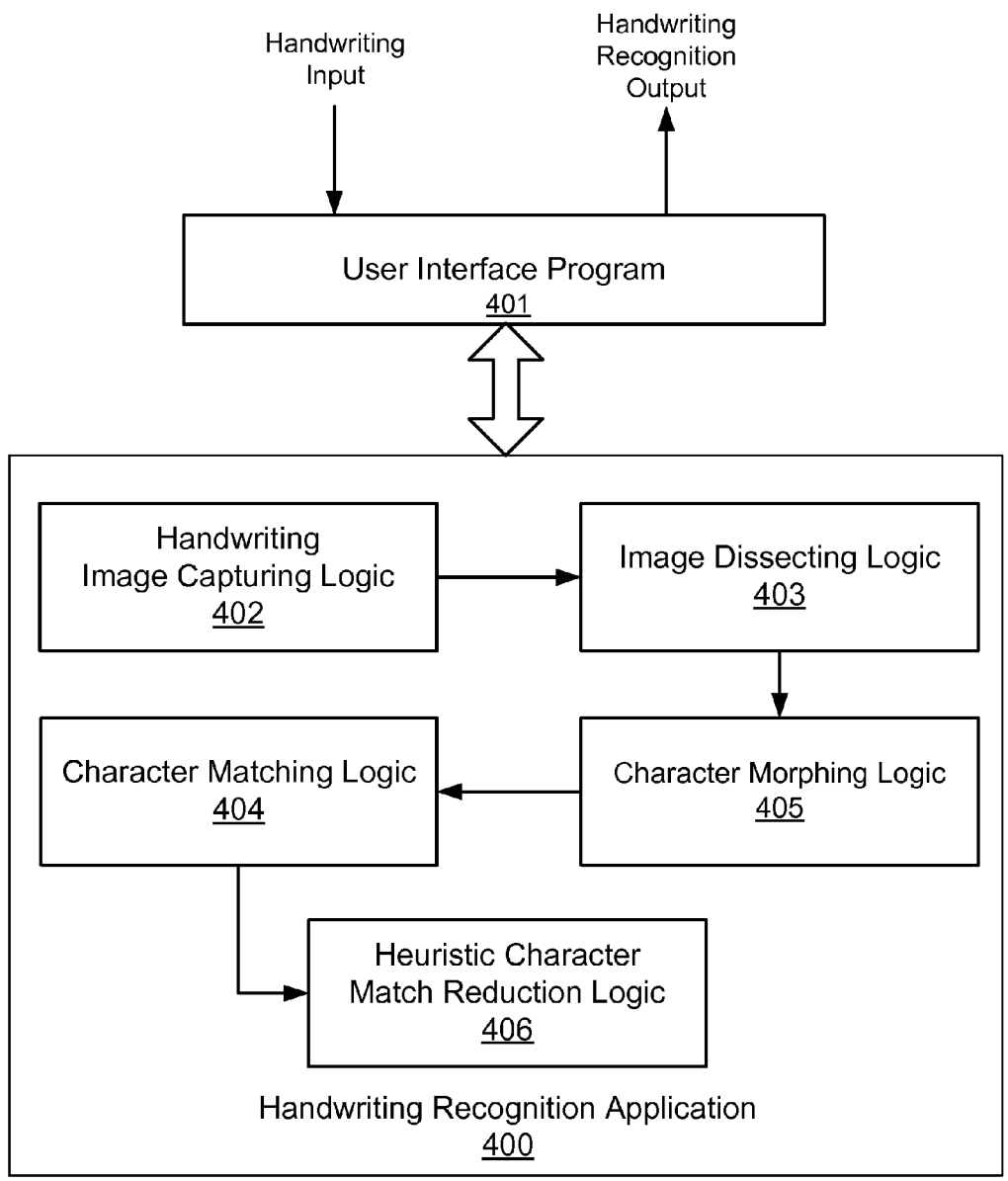
FIG. 4 is a block diagram of functional components in a handwriting recognition application, according to an exemplary embodiment of the invention.

FIG. 4 is a block diagram illustrating functional components of a handwriting recognition system in an exemplary embodiment of the present invention. The system may be implemented as a handwriting recognition application 400 operating in memory 212 of computer 200. Alternatively, functions of the application 400 may be implemented as computer instructions to be executed by other computer-based devices that provide handwriting recognition capability. Handwriting recognition application 400 may receive handwriting input through a user interface program 401 which in turn may receive the input from a handwriting capturing device (not shown), such as a electronically sensitive writing surface or an optically based writing surface. Handwriting recognition application 400 may further interface with user interface application 401 to receive user commands and present recognition results to the user.

The handwriting recognition application 400 comprises capturing logic 402 for processing and preparing an image of a handwriting for recognition by the application. Capturing logic 402 receives and maintains an image of the handwriting in digital form for processing. This image usually comprises of black and white pixels that represent the handwriting, but may comprise color pixels or pixels in various gray levels. In the illustrated embodiment, capturing logic 402 may initially filter the image to eliminate errors and sharpen the image to facilitate the recognition process. Once the image has been pre-processed, image dissecting logic 403 examines the image to identify consecutive rows of white pixels. These rows of white pixels generally correspond to one or more blank lines between two adjacent lines of characters in the handwriting. Dissecting logic 403 uses the identified rows of white pixels to separate the handwriting into individual handwriting lines. For each line of handwriting, dissecting logic 403 next identifies consecutive columns of white pixels in the line. These consecutive columns of white pixels generally correspond to a break between two adjacent words in the writing. Dissecting logic 403 then separates the line of words being processed into individual words based on the detected consecutive columns of white pixels.

For each individual word, dissecting logic 403 separates the word into individual characters by identifying consecutive columns that have approximately the same number of black pixels at generally the same height (i.e., generally the same y-axis coordinates). Such consecutive columns correspond to a connecting stroke between two adjacent characters in a word. The column of the back pixels closest to the center of an identified group of consecutive columns is the separation point between the two characters adjacent to the identified group of consecutive columns of black pixels. In addition, embodiments of the invention consider the distance from the top left corner of the image boundary to the identified consecutive columns of generally the same number of black pixels in separating a word into characters. As an example, consider the "h" and "a" characters illustrated in FIG. 9. The left most column at the start of "h" has a large number of black pixels, and then there is a group of consecutive columns of single-pixel at generally the same height, which correspond to the horizontal connection between the two vertical strokes in the character "h". Moving further to the right, the number of black pixels in the column increases again, which corresponds to the second vertical stroke in the character. The number of pixels in the columns next drops off at the end of "h" to a small and generally the same number of black pixels, e.g., usually 1 or 2 pixels. Thus, a second group of consecutive columns of generally the same number of pixels is detected following the second vertical stroke in the character "h". Both identified groups of consecutive columns of black pixels can be potential areas for separating the characters in the word. However, the second group is selected as the separation since it is further from the top left corner of the character image than the first group. The consideration of this distance is particularly beneficial in distinguishing the lowercase character "l" from the uppercase character "i", and character "u" from character "w". These characters have two or three such groups of consecutive columns of generally the same number of black pixels at generally the same height.

Once character dissecting logic 403 separates a word into individual characters, character morphing logic 405 reduces the image of each character to an image having a single-pixel width. The reduction of the line width in the character image to a representative skeleton, which is single-pixel wide, may be achieved by thinning the image using neighborhood maps with a 3×3 grid or a mask. This process generally detects the edges of a multi-pixel thick image and iteratively deletes outermost layers to achieve a single-pixel wide representation of the character. Character matching logic 404 next performs the matching of the reduced character image against those in a character library.

In one embodiment of the present invention, matching logic 404 determines a boundary and center of the character image based on the smallest and largest x-y coordinates of the black pixels in the character image. The image boundary is preferably a rectangle defined by coordinates (x_min, y_min) and (x_max, y_max), where (x_min, y_min) and (x_max, y_max) are the minimum and maximum coordinates of the black pixels in the image. The coordinates of the image center is defined as (x_min+x_max)/2 and (y_min+y_max)/2. Matching logic 404 then counts the total number N of all black pixels within the image boundary. It also determines an angle (of an angular coordinate) for each black pixel based on a virtual line going through the image center and the respective black pixel.

The matching logic 404 further partitions the character image into a number of segments. In an exemplary embodiment of the invention, the character image is divided into sixteen radial (pie-shaped) segments in sizes of 10, 20, 30 and 60 degrees in the following pattern: 10, 20, 30, 20, and 10 degrees for the two right quadrants of the character image boundary and 10, 20, and 60 degrees for the two left quadrants of the character image boundary. The resulting segments would be at 0-10, 20-30, 30-60, 60-90, 90-100, 100-120, 120-180, 180-240, 240-260, 260-270, 270-280, 280-300, 300-330, 330-350, 350-360 degrees, respectively, with the first segment (0 to 10 degrees) beginning at the x-axis (0 degree line) and the sequence of the segments going counter-clockwise. This segmentation is based on the natural propensity of character writing for languages that write from left to the right to have more feature richness in terms of curvature, edges, and open areas which leads to the combination of ratios in the different segments in the character image being unique for different characters.

For each segment (i), matching logic 404 counts the number $S_i$ of black pixels in the segment. Matching logic 404 then compares the ratio $S_i/N$ to a predetermined range of values for a corresponding segment of a reference character in the character reference library, where N is the total number of black pixels in the character image. For example, when matching logic 404 examines the segment of 240-260 degrees, it compares the ratio $S_i/N$ for this segment to an established value range for the corresponding segment of 240-260 degrees of a reference character in the character reference library.

In an exemplary embodiment of the invention, character matching logic 404 determines that a particular reference character is the character in the image if more than a predetermined percentage (e.g., 60 percent) of the segments have their $S_{i\_ref}/N\_ref$ ratios within predetermined value ranges of the corresponding segments in the particular preference character. The value $S_{i\_ref}$ is the number of black pixels in the segment (i) of the reference character and the value $N\_ref$ is the total number black pixels in the reference character. If matching logic 404 identifies more than one reference character that match the character image, then match reduction logic 406 performs a heuristic process to eliminate potential mis-matches to arrive at the best match for the character in the image. In the exemplary embodiment of the invention, match reduction logic 406 applies the heuristic reduction to those segments in the character image that correspond to the lowest reference pixel ratios $S_{i\_ref}/N\_ref$. Match reduction logic 406 further partitions each of these segments of the character image into smaller sub-segments, e.g., 2 or 4 sub-segments, and repeats the matching process using the smaller sub-segments. The smaller sub-segments allow the character image to be compared to the matching reference characters at a finer granularity to arrive at the best match for the character being recognized.

Figure 5:
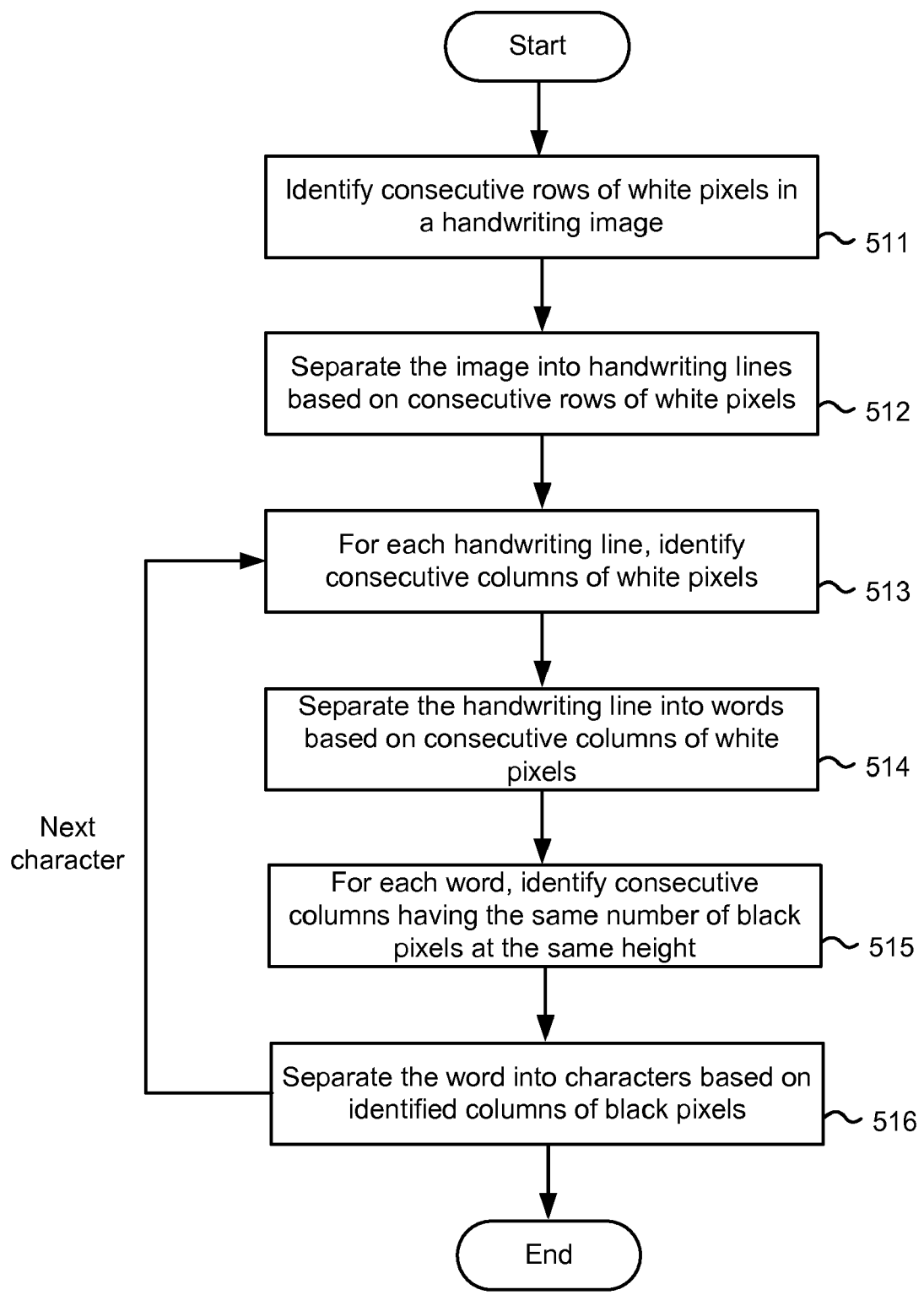
FIG. 5 is a flowchart of a process for analyzing a handwriting sample to identify individual characters in the handwriting, according to an exemplary embodiment of the invention.

FIG. 5 is a flowchart of an exemplary high-level process for analyzing a handwriting to isolate individual characters in the writing, as part of the recognition of the writing. Initially, the process identifies consecutive rows of white pixels in an image of a handwriting, at step 511. The identified consecutive rows of white pixels correspond to blank spaces between adjacent lines in the handwriting and allow the lines to be separated, per step 512. For each line of handwriting, the process identifies consecutive columns of white pixels, which correspond to a space between two adjacent words in the line, at step 513. Using the identified groups of consecutive columns of white pixels, the process dissects the line into individual words, per step 514. For each word, the process next identifies consecutive columns that have approximately the same number of black pixels at the same height, i.e., in the direction perpendicular to the direction in which the characters are written in the line, at step 515. The identified consecutive columns of black pixels generally correspond to a connection between adjacent characters in a word. The process separates the word into individual characters based on these connections, per step 516.

Figure 6:
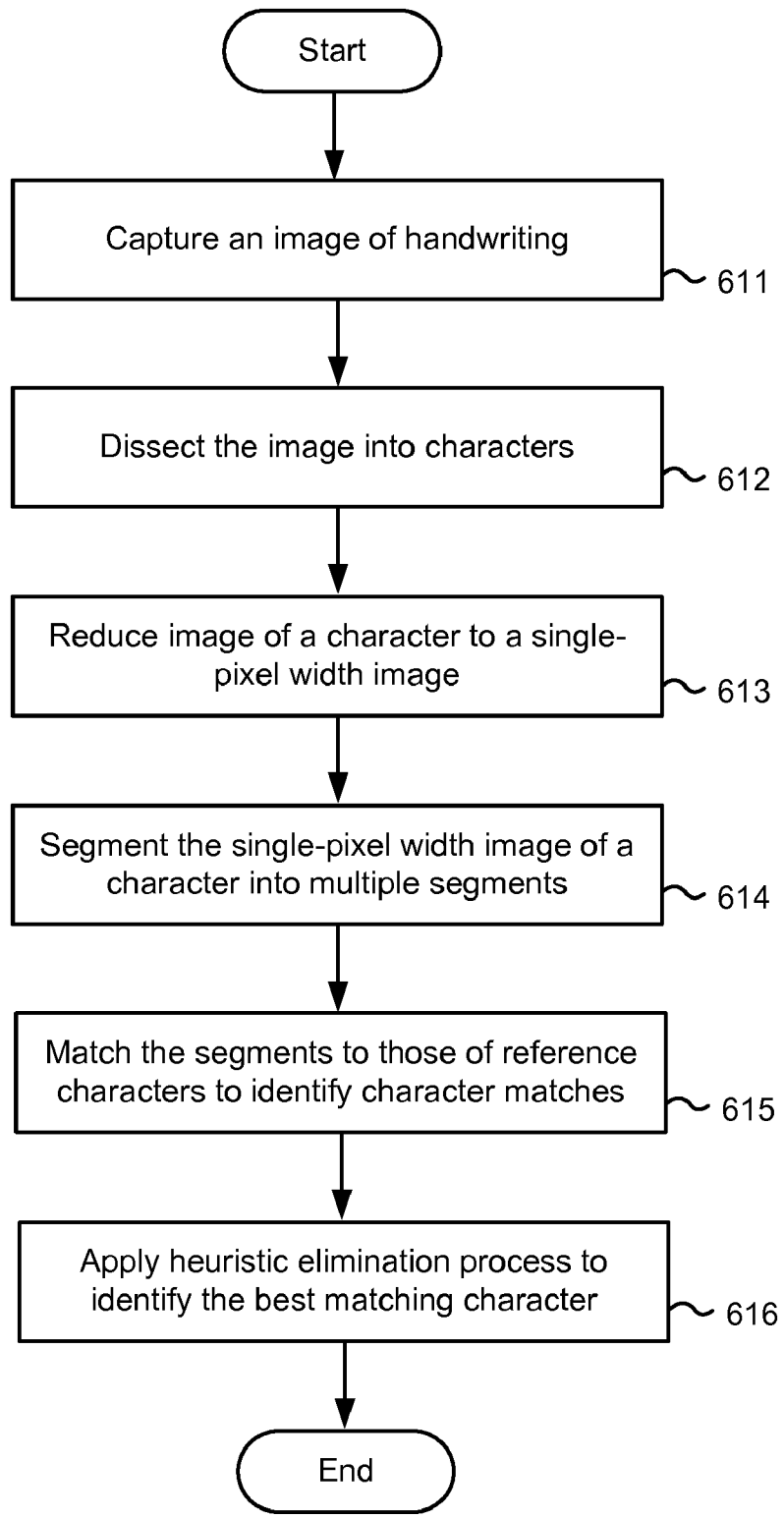
FIG. 6 is a flowchart of an exemplary process for recognizing a handwritten character in accordance with aspects of the invention.

FIG. 6 is a flowchart of an exemplary process for recognizing a handwritten character according to aspects of the invention. Initially, at step 611, the process captures an image of a handwriting to be recognized using an electronically or optically based handwriting device, such as pad computer 100 described with reference to FIG. 1. The process then dissects the handwriting into individual characters, at step 612, as described for the exemplary embodiment shown in FIG. 4. At step 613, the process reduces the image of a character to a single-pixel width image. The reduced image is partitioned into a number of the radial segments with known positions relative to a reference coordinate, at step 614. The reduced character image is compared against those in a character reference library, based on the ratios of black pixels in the radial segments compared to the total number of black pixels, to identify a matching character, per step 615. If there are more than one matching character, then the process goes through a heuristic process at step 616 to eliminate invalid matches and arrive at the best matching character for the image being process.

Figure 7:
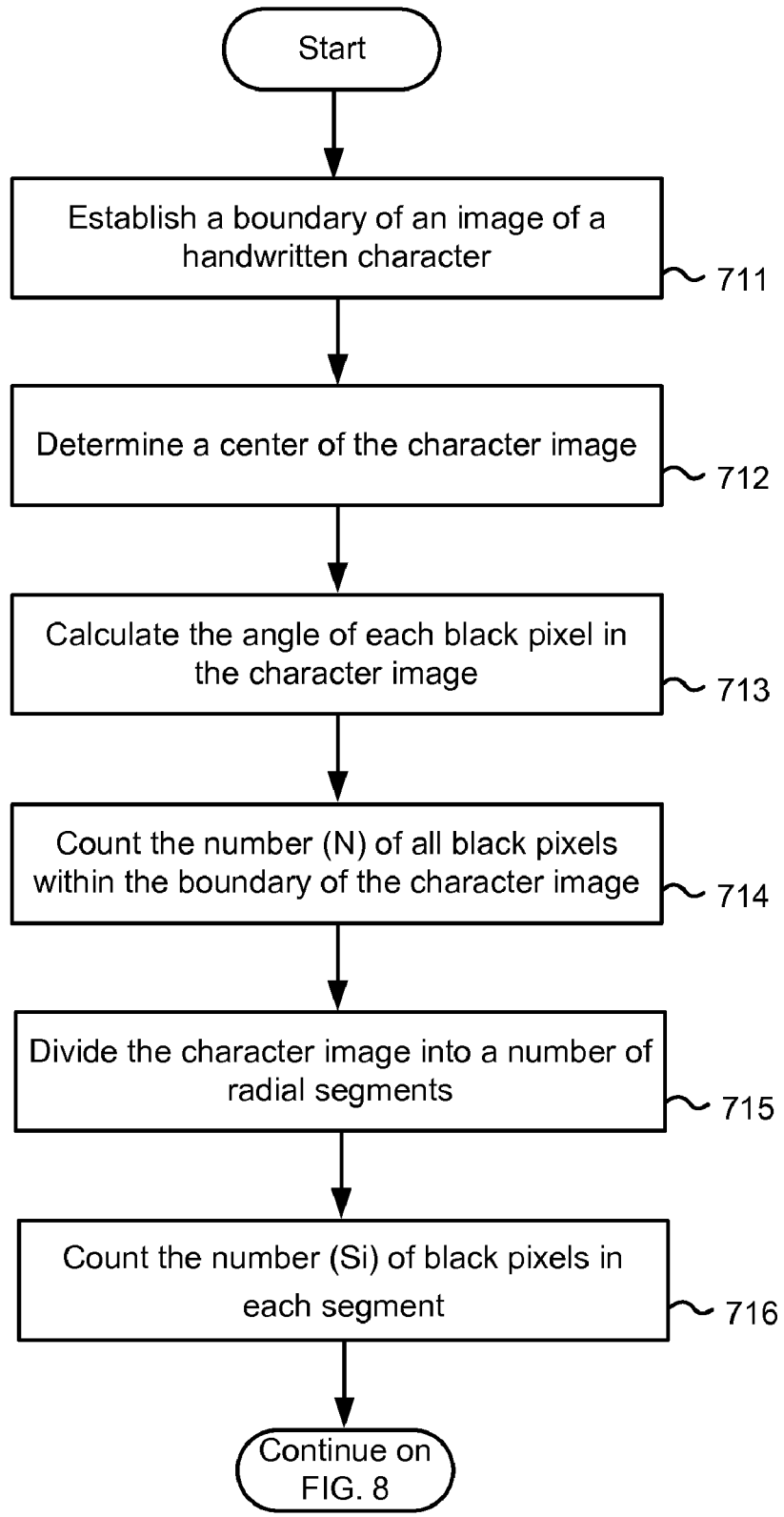
FIG. 7 is a flowchart of an exemplary and more detailed process for recognizing a handwritten character in accordance with aspects of the invention.

FIG. 7 is a flowchart of an exemplary and more detailed process for recognizing a handwritten character in accordance with aspects of the invention. At step 711, the process establishes a boundary for an image of the handwritten character. A center of the character image is determined at step 712. At step 713, the process determines an angle associated with each black pixel in the image relative to a reference coordinate, e.g., in the x-axis direction. The process counts the total number (N) of black pixels in the character image at step 714. It further partitions the character image into a number of radial (angular) segments, at step 715. In an exemplary embodiment of the invention, the character image is divided into sixteen unequal radial (pie-shaped) segments of 0-10, 10-30, 30-60, 60-80, 80-90, 90-100, 100-120, 120-180, 180-240, 240-260, 260-270, 270-280, 280-300, 300-330, 330-350, and 350-360 degrees. At step 716, the process counts the number (Si) of black pixels in each of the segments to arrive at a pixel ratio Si/N for the current segment (i).

FIG. 7 is a flowchart representing the operations that continue from the exemplary embodiment of the process for recognizing a handwritten character illustrated in FIG. 6. At step 711, the process compares ratios Si/N for the segments in the character image to value ranges for corresponding segments in a reference character. Reference characters and their value ranges may be maintained in a reference library. If the Si/N ratios of more than a predetermined number of segments fall within the respective value ranges for a reference character, then the reference character is the character in the image, per step 712. If there is only one match from the reference library, then the character in the image has been recognized, per the determination at step 713. Otherwise, the process starts a heuristic phase to narrow the matching characters to the best match by partitioning the character image into segments smaller than the previous segments for those with the lowest Si/N ratios, at step 714. The process counts the number (Si) of black pixels in each smaller segment at step 715, and repeats the comparison of the ratios Si/N for the smaller segments to the reference characters to find the best match, as shown by step 716.

Figure 8:
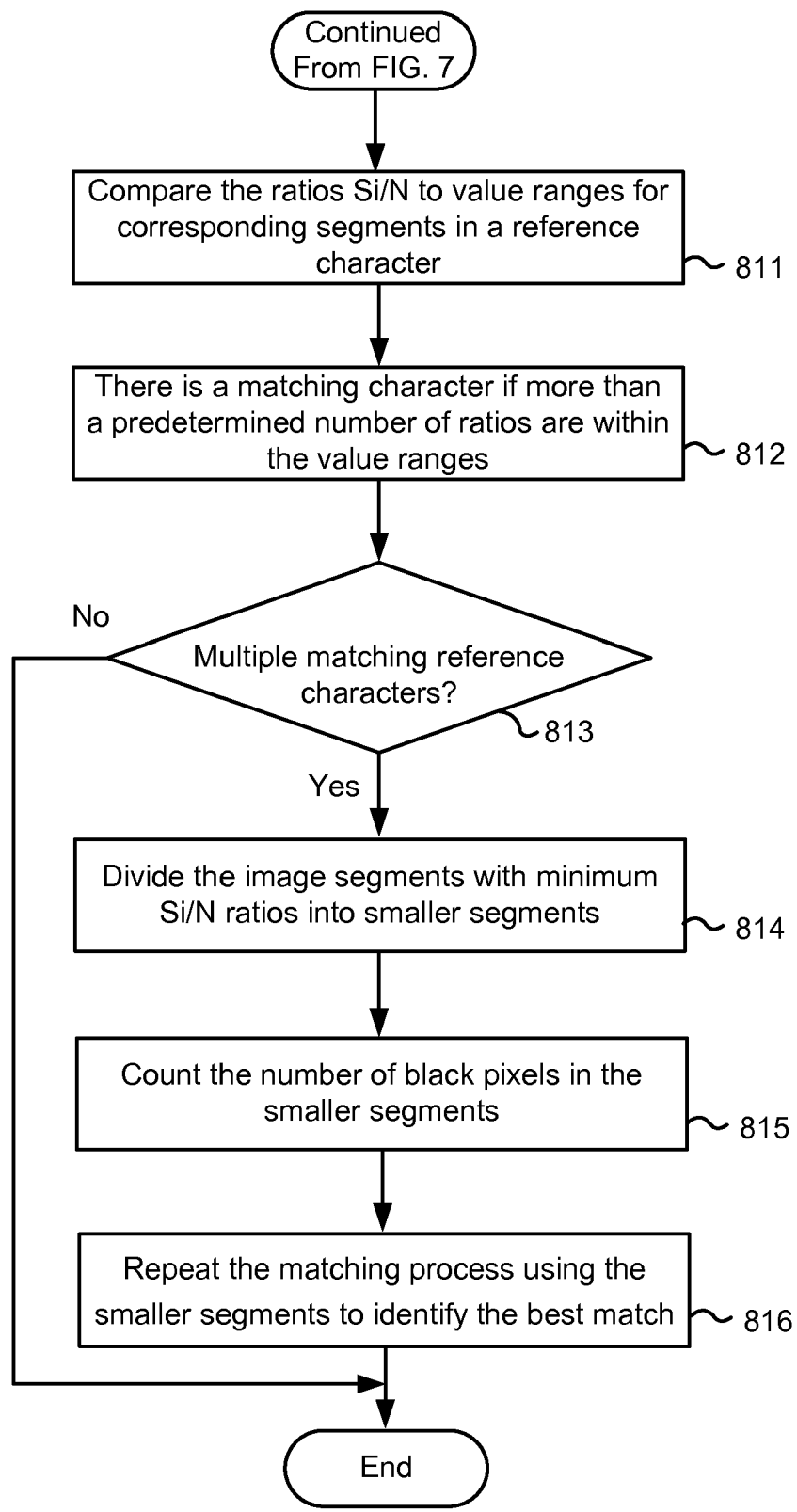
FIG. 8 is a flowchart representing the operations that continue from the exemplary embodiment of the process for recognizing a handwritten character shown in FIG. 7.

FIG. 8 shows a flowchart representing the operations that continue from the exemplary embodiment of the invention shown in FIG. 7. At step 811, the process compares the ratios Si/N of the segments (i) in the character image to predetermined ranges of the reference ratios Si_ref/N_ref for the corresponding segments of a reference character in the reference library. A segment (i) in the character image matches a corresponding segment in the reference character if its ratio Si/N is within the respective value range for a reference ratio Si_ref/N_ref of the corresponding segment in the reference character. If more than a predetermined number of the segments in the character image match their corresponding segments in the reference character, then the character in the image is recognized as the reference character, per step 812. If there is only one matching reference character, then the character in the character image has been recognized as the matching reference character. However, if the character in the image matches to multiple reference characters, as determined at step 813, then the process continues with a heuristic process to narrow the matches down to one best matching reference character, at step 814. This heuristic reduction is preferably applied to those segments in the character image that correspond to the lowest reference pixel ratios Si_ref/N_ref. The match reduction process partitions these segments of the character image further into smaller sub-segments, e.g., 2 or 4 sub-segments, and repeats the matching process using the sub-segments. The sub-segments allow the character image to be compared to the matching reference character at a finer granularity to arrive at the best match for the character being recognized. The process counts the number of black pixels in the sub-segments, at step 815, and repeats the segment matching process using the smaller sub-segments, at step 816.

Figure 9:
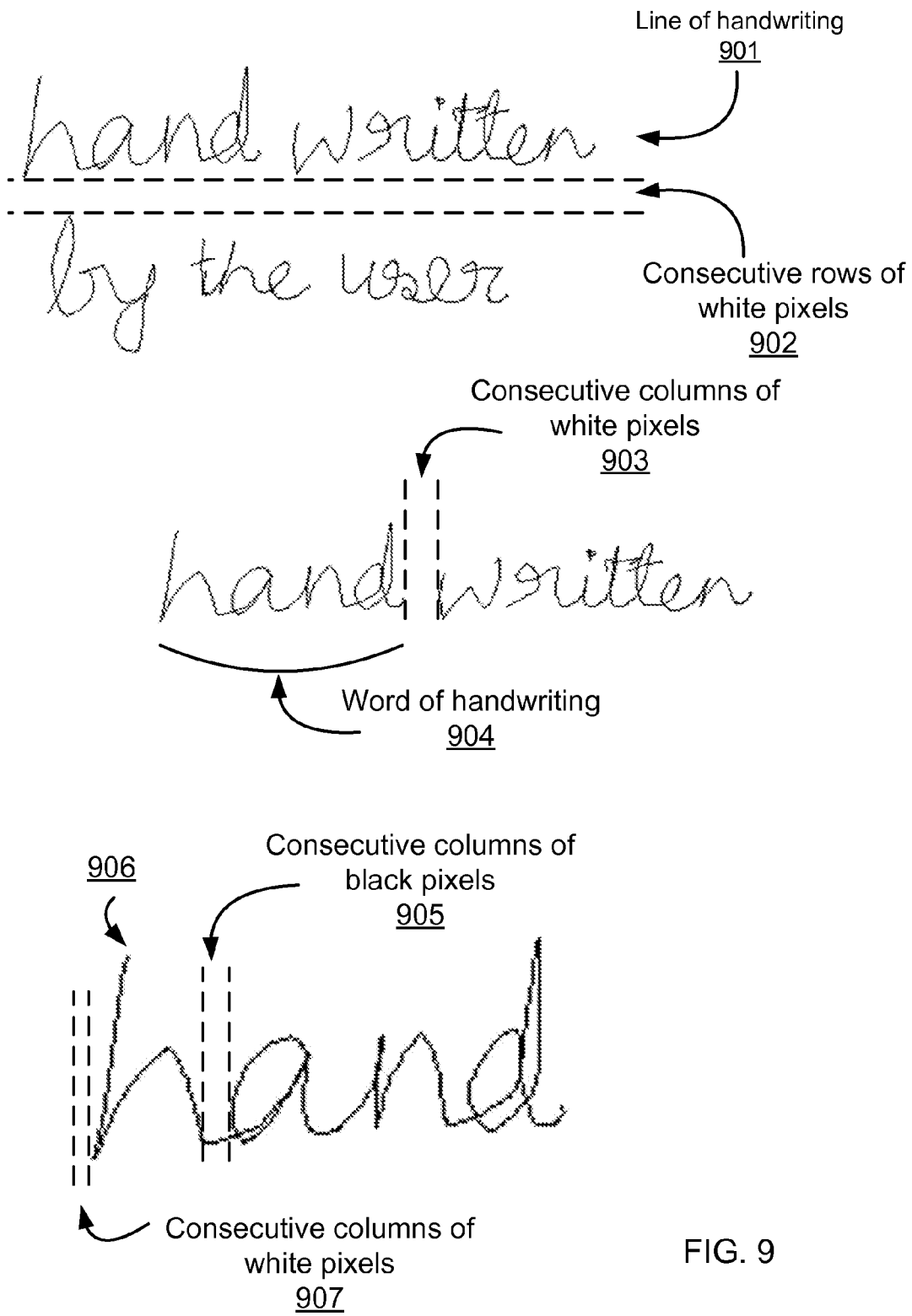
FIG. 9 illustrates an example of a handwritten character being segmented and recognized using one or more exemplary embodiments of the invention.

FIG. 9 illustrates an example of a cursive handwriting that may be recognized using one or more exemplary embodiments of the invention as described. The illustrated cursive handwriting may be captured as an image of black and white pixels from a handwriting input device such as the pad computer 100 of FIG. 1. The recognition begins with a separation of the handwriting into handwriting lines, such as line 901, by identifying consecutive rows 902 of white pixels in the handwriting. The process next separates line 901 into individual words, such as word 904, by identifying consecutive columns 903 of white pixels in the handwriting line 901. Each word 904 is further dissected into individual characters starting with the leftmost character 906. The start of character 906 is identified by the leftmost column of black pixels after columns 907 of white pixels. The end of character 906 is identified by a column having the minimum number of black pixels and the lowest y-axis coordinate compared to the adjacent columns with similar minimum numbers of black pixels. Alternatively, the end of the character may be the center of consecutive columns with minimum black pixels that have similar y-axis coordinates. As an example, referring to FIG. 9, as one moves from the leftmost column to the right and evaluates those columns that have only one black pixel and the lowest y-axis coordinates, the first separation point would be between the "h" and "a" characters. Individual characters, such as character 906, are then processed and recognized against reference characters according to the exemplary embodiments described above with reference to FIGS. 6-8.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method for recognizing handwriting, comprising:
   capturing a handwritten character as an image of pixels;
   partitioning the image into a plurality of segments, each segment having a ratio of the number of pixels in the segment divided by the total number of pixels in the image; and
   comparing the pixel ratio for each segment to a value range associated with a corresponding segment of a reference character, wherein the handwritten character is recognized as the reference character if more than a predetermined number of the segments in the image have the pixel ratios within the respective value ranges of the reference character, wherein the handwriting comprises a word and the method further comprises dissecting the word into individual characters and, wherein dissecting the word comprises identifying consecutive columns of recognizable pixels that have generally the same number of recognizable pixels at the same height and separating the word into the individual characters based on the identified consecutive columns of recognizable pixels.

2. The method of claim 1, further comprising reducing the image to an image having a single-pixel width before comparing the pixel ratios of the segments.

3. The method of claim 1, wherein the image is partitioned into a plurality of radial segments based on a boundary and a center of the image, the image boundary and center being determined from minimum and maximum coordinates of the pixels in the image.

4. The method of claim 1, wherein the number of pixels in each segment and the total number of pixels in the image are determined based on an angle, relative to the center of the image, associated with each pixel.

5. The method of claim 1, further comprising partitioning a segment into smaller sub-segments if multiple reference characters match the character image, and comparing the pixel ratios for the sub-segments to arrive at the best matching reference character.

6. The method of claim 1, wherein the handwriting comprises a sentence and the method further comprises dissecting the sentence into individual words.

7. The method of claim 6, wherein dissecting the sentence comprises identifying consecutive rows of white pixels in an image of the sentence and separating the sentence into the individual words based on the identified rows of white pixels.

8. The method of claim 1, wherein the image comprises of black and white pixels.

9. The method of claim 1, wherein the handwriting is a cursive handwriting.

10. A computer program product for recognizing handwriting, the product comprising a non-transitory computer readable medium having program code embodied therein and operable to:
    capture a handwritten character as an image of pixels;
    partition the image into a plurality of segments each having a pixel ratio of the number of pixels in the segment divided by the total number of pixels in the image; and
    compare the pixel ratio for each segment to a value range associated with a corresponding segment of a reference character, wherein the handwritten character is recognized as the reference character if more than a predetermined number of the segments in the image have the pixel ratios within the respective value ranges of the reference character, wherein the handwriting comprises a word and the computer program product further comprises program code operable to dissect the word into individual characters, and wherein the computer program product further comprises program code operable to identify consecutive columns of recognizable pixels that have generally the same number of recognizable pixels at the same height and separate the word into the individual characters based on the identified consecutive columns of recognizable pixels.

11. The computer program product of claim 10, wherein the handwriting comprises a sentence and the program product comprises program code operable to identify consecutive rows of white pixels in an image of the sentence and separate the sentence into the individual words based on the identified rows of white pixels.

* * * * *